July 20, 1965     F. M. SHETLER     3,195,464
AIR CONTROL SYSTEM FOR LIQUID STORAGE TANKS
Filed May 29, 1963
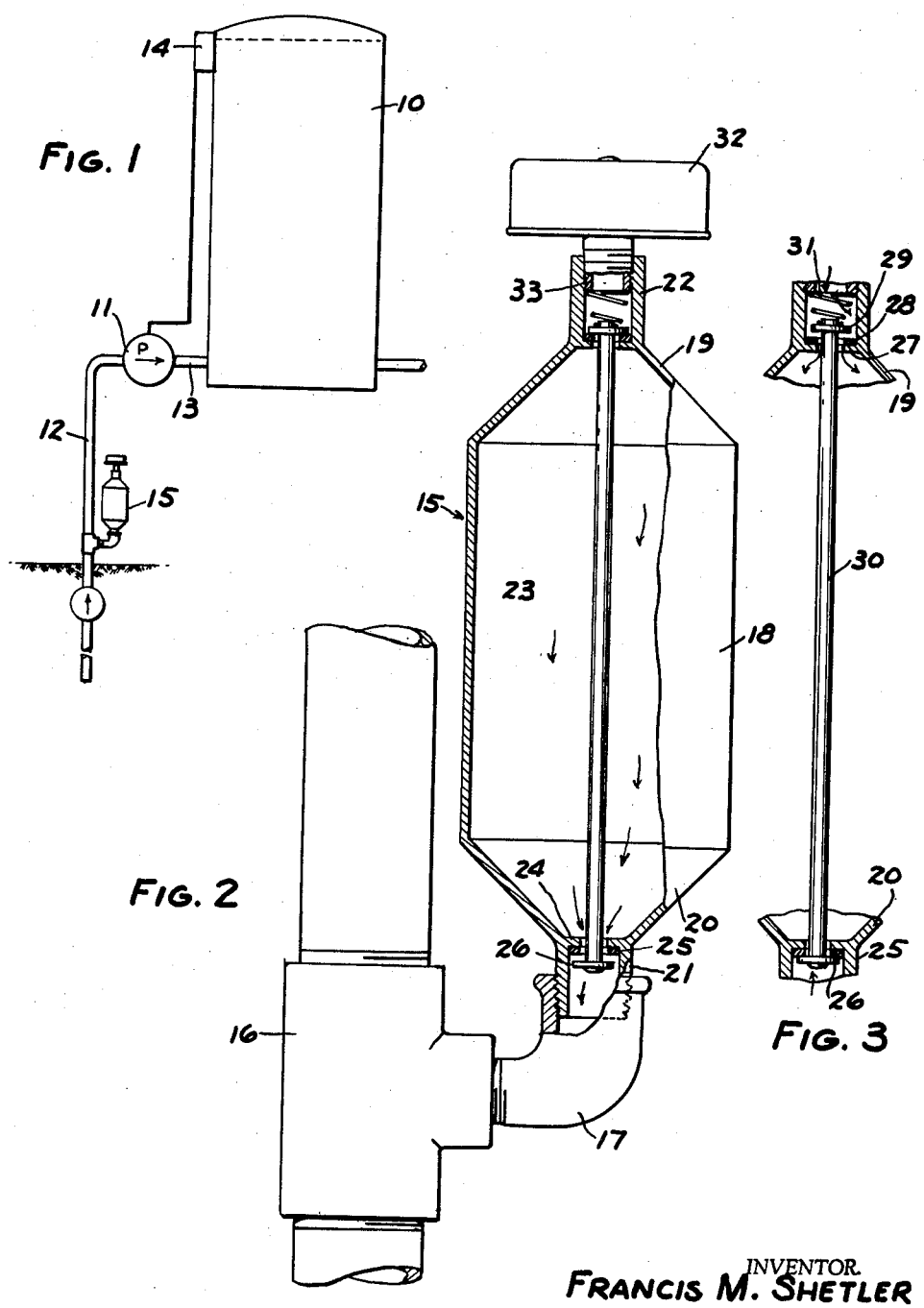
INVENTOR.
FRANCIS M. SHETLER
BY
Barnes, Kisselle, Raisch & Choate
ATTORNEYS

United States Patent Office 3,195,464
Patented July 20, 1965

3,195,464
AIR CONTROL SYSTEM FOR LIQUID
STORAGE TANKS
Francis M. Shetler, % Flint Pump & Equipment Co.,
G-3289 Flushing Road, Flint, Mich.
Filed May 29, 1963, Ser. No. 284,248
8 Claims. (Cl. 103—6)

This invention relates to an air control system for liquid storage tanks.

In water storage tanks such as used in home and industry wherein the water is periodically removed from the tanks and periodically replenished by operation of a pump which pumps the water from a source to the tank, it is necessary to also replenish the air supply above the water in the storage tank to maintain the pressure on the water and thereby insure proper flow of the water out of the storage tank.

It is an object of this invention to provide a simple, efficient and inexpensive apparatus for replenishing the air in the storage tank.

It is a further object of the invention to provide such an apparatus which will operate upon each energization of the pump to introduce a predetermined amount of air to the storage tank.

In the drawings:

FIG. 1 is a partly diagrammatic elevation of a system embodying the invention.

FIG. 2 is a fragmentary part sectional view on an enlarged scale showing the device for introducing the air to the system shown in FIG. 1.

FIG. 3 is a fragmentary part sectional view showing the parts in a different operative relationship.

Referring to FIG. 1, a liquid storage tank 10, such as a water tank, is supplied with liquid by a vane-type pump 11 which has its inlet connected to a source of liquid such as a well in the ground by a pipe 12 and its outlet connected to the tank by a pipe 13. The pump is operable periodically as the level in the tank changes and in accordance with any well-known level control system, herein shown schematically as 14, which is responsive to the pressure or level of the liquid in the storage tank 10.

In accordance with the invention, an air control device 15 is provided and connected to the pipe 12 extending from the source of liquid to the pump 11.

As shown in FIG. 2, the pipe 12 is provided with a T connection 16 into which an elbow 17 is threaded. The device 15 comprises a housing 18 having reduced upper and lower ends 19, 20. The lower end 20 is formed with a fitting 21 that is externally threaded so that the device can be threaded into the elbow 17. The upper end of the housing 18 at the reduced portion 19 is provided with a cylindrical projection 22, as presently described.

The fitting 21 provides an outlet from the chamber 23 within the housing 18 and the fitting 22 provides an inlet to the chamber 23. A shoulder 24 is provided adjacent the outlet 21 and a gasket 25 is mounted adjacent the shoulder and co-operates with a valve 26 in the form of a solid disc to open and close the outlet 21. Similarly, a shoulder 27 is provided at the inlet 22 on which a gasket 28 is fixed to cooperate with a disc 29 for opening and closing the inlet. The discs 26, 29 are fixed on a rod 30 which interconnects the discs so that they are actuated simultaneously in such a manner that when the valve disc 26 is closed, the valve disc 29 is open and when the valve disc 29 is open the valve disc 26 is closed.

A light spring 31 is provided in the inlet 22 and tends to yieldingly urge the rod 30 and, in turn, the valve discs 26, 29 downwardly so that the outlet 21 is normally open and the inlet 22 is normally closed.

An air filter 32 is threaded into the upper end of the inlet 22 and the spring is compressed between a threaded fitment 33 in the air filter and the upper end of the valve disc 29.

In accordance with the invention, each time the pump 11 is energized, the suction of the pump causes the rod 30 to move downwardly moving the valve disc 26 to open the outlet 21 and moving the valve disc 29 to close the inlet 22. The air in chamber 23 is thereby permitted to pass to the intake of the pump 11 and thereafter to the tank 10. When the pump 11 is de-energized, the suction at the inlet of the pump 11 is no longer present and the relative pressure increases forcing the sealing disc 26 into closing relationship and through the rod 30 opening the sealing disc 29 so that the inlet 22 permits communication to the atmosphere and the air may enter the chamber 23. Each time the pump 11 is energized, a predetermined quantity of air from the chamber 23 passes to the storage link.

It can thus be seen that there has been provided a simple, efficient and low-cost air control device for liquid storage systems.

I claim:

1. In an air control system for liquid storage tanks, the combination comprising
    a liquid storage tank,
    a rotary vane pump,
    said pump having an inlet and an outlet,
    means for connecting the outlet of the pump to the liquid storage tank,
    means connecting the inlet of the pump to a source of liquid,
    and air intake means connected to said last-mentioned means and comprising
    a housing defining an air chamber having an inlet and an outlet,
    a first valve associated with said housing for opening and closing the inlet to said housing,
    a second valve associated with said housing for opening and closing the outlet to said housing,
    and means interconnecting said first and second valves in such a manner that when the pump is energized, the suction at the inlet of the pump closes the first valve and opens the second valve permitting the air to pass from the chamber in the housing to the pump and when the pump is deenergized the pressure of liquid in the pump closes the second valve and opens the first valve venting the chamber through the atmosphere.

2. The combination set forth in claim 1 including spring means yieldingly urging said first valve in closed position and said second valve into open condition.

3. In an air control system for liquid storage tanks, the combination comprising
    a liquid storage tank,
    a rotary vane pump,
    said pump having an inlet and an outlet,
    means for connecting the outlet of the pump to the liquid storage tank,
    means connecting the inlet of the pump to a source of liquid,
    and air intake means connected to said last-mentioned means and comprising
    a housing defining an air chamber having an inlet and an outlet which are directly opposed and in line,
    a first valve associated with said housing for opening and closing the inlet to said housing,
    a second valve associated with said housing for opening and closing the outlet to said housing,
    and means interconnecting said first and second valves in such a manner that when the pump is energized, the suction at the inlet of the pump closes the first valve and opens the second valve permitting the air to pass from the chamber in the housing to the pump and when the pump is deenergized the pressure of liquid in the pump closes the second valve and opens the first valve venting the chamber through the atmosphere.

4. The combination set forth in claim 3 wherein said means interconnecting said first and second valve includes a rod.

5. In an air control system for liquid storage tanks, the combination comprising
a liquid storage tank,
a rotary vane pump,
said pump having an inlet and an outlet,
means for connecting the outlet of the pump to the liquid storage tank,
means connecting the inlet of the pump to a source of liquid,
and air intake means connected to said last-mentioned means and comprising a housing defining an air chamber having an inlet and an outlet,
a first valve associated with said housing for opening and closing the inlet to said housing,
a second valve associated with said housing for opening and closing the outlet to said housing,
and means interconnecting said first and second valves in such a manner than when the pump is energized, the suction at the inlet of the pump closes the first valve and opens the second valve permitting the air to pass from the chamber in the housing to the pump and when the pump is deenergized the pressure of liquid in the pump closes the second valve and opens the first valve venting the chamber through the atmosphere.

6. The combination set forth in claim 5 wherein said means interconnecting said valves comprises a rod rigidly interconnecting said valve.

7. The combination set forth in claim 5 including spring means urging said first valve into closed relation and said second valve into open relation.

8. The combination set forth in claim 5 wherein said housing includes a threaded end portion adjacent the outlet thereof by which the housing can be attached to the line extending between the water source and the pump inlet.

References Cited by the Examiner
UNITED STATES PATENTS

| | | | |
|---|---|---|---|
| 1,552,088 | 9/25 | Smith | 103—6 |
| 1,625,892 | 4/27 | Hollander | 103—6 |
| 1,963,867 | 6/34 | Robisch | 103—6 |
| 2,360,401 | 10/44 | Crow | 103—6 |
| 2,457,863 | 1/49 | Burks | 103—6 |
| 2,692,558 | 10/54 | Garrett | 103—6 |
| 2,839,001 | 6/58 | Tubbs | 103—6 |
| 2,851,951 | 9/58 | Deters | 103—6 |
| 3,097,604 | 7/63 | Morgan | 103—6 |

ROBERT M. WALKER, *Primary Examiner.*

LAURENCE V. EFNER, *Examiner.*